United States Patent [19]

Vories

[11] Patent Number: 5,844,150
[45] Date of Patent: Dec. 1, 1998

[54] LEAP FROGGING HYDROSTATIC ALTIMETER WITH CARRY FUNCTION

[75] Inventor: Dennis L. Vories, Valley Center, Calif.

[73] Assignee: The Stanley Works, New Britian, Conn.

[21] Appl. No.: 4,485

[22] Filed: Jan. 8, 1998

Related U.S. Application Data

[62] Division of Ser. No. 757,008, Nov. 26, 1996, Pat. No. 5,726,365, which is a continuation of Ser. No. 402,511, Mar. 10, 1995, abandoned, which is a continuation-in-part of Ser. No. 177,532, Jan. 5, 1994, abandoned.

[51] Int. Cl.$^6$ ........................................................ G01C 5/04
[52] U.S. Cl. ........................................................... 73/865.2
[58] Field of Search ............................... 73/865.2; 33/377

[56] References Cited

U.S. PATENT DOCUMENTS

| | | | |
|---|---|---|---|
| 2,844,037 | 7/1958 | Jordan | 73/865.2 |
| 3,815,423 | 6/1974 | Gearhart | 73/865.2 |
| 3,916,380 | 10/1975 | Anderson | 340/825.04 |
| 3,997,765 | 12/1976 | Marathe | 377/72 |
| 4,026,156 | 5/1977 | Bowditch et al. | 73/865.2 |
| 4,040,677 | 8/1977 | Bleckmann | 701/71 |
| 4,356,639 | 11/1982 | Alarcon Opazo | 73/865.2 X |
| 4,878,297 | 11/1989 | Vories | 33/366 |
| 4,974,164 | 11/1990 | Lewis et al. | 33/707 X |
| 5,307,698 | 5/1994 | Endres | 73/865.2 |
| 5,517,869 | 5/1996 | Vories | 73/865.2 |

OTHER PUBLICATIONS

*Patent Abstracts of Japan* (07–21543o) Aug. 15, 1995 "Price Paying System Having Goods, Housing Body Corging Function" by Kenji Yamamoto.

*Primary Examiner*—Thomas P. Noland
*Attorney, Agent, or Firm*—Thomas J. Tighe

[57] ABSTRACT

A hydrostatic measurement module senses elevation relative to a fluid reservoir under a reference pressure. The measurement module further includes a plurality of functions and modes. A zero function sets the display to zero at any selected benchmark elevation. One function allows the invention to measure heights and elevations beyond its physical reach. A hold function freezes stable display values. A mark function sets upper/lower limit tones described in the existing patent. A record function allows a large number of measurements to be taken for real-time calculation and display of average, minimum and maximum values. A scale function can be used to select one of five display scales. A resolution function permits more rapid readings at lower precision. A temperature function displays ambient temperature. A record data function is used to accumulate 135 or more individual data points within the measurement module or to download data as it is taken to a computer, such as a pocket personal computer (PC). An inspect/dump function allows downloading of stored recorded data to a PC, or inspection of stored data as a function of sequence and position. An elevation function can be used to display any desired elevation to make readings easier to correlate to drawings drafted in elevation relative to sea level.

2 Claims, 16 Drawing Sheets

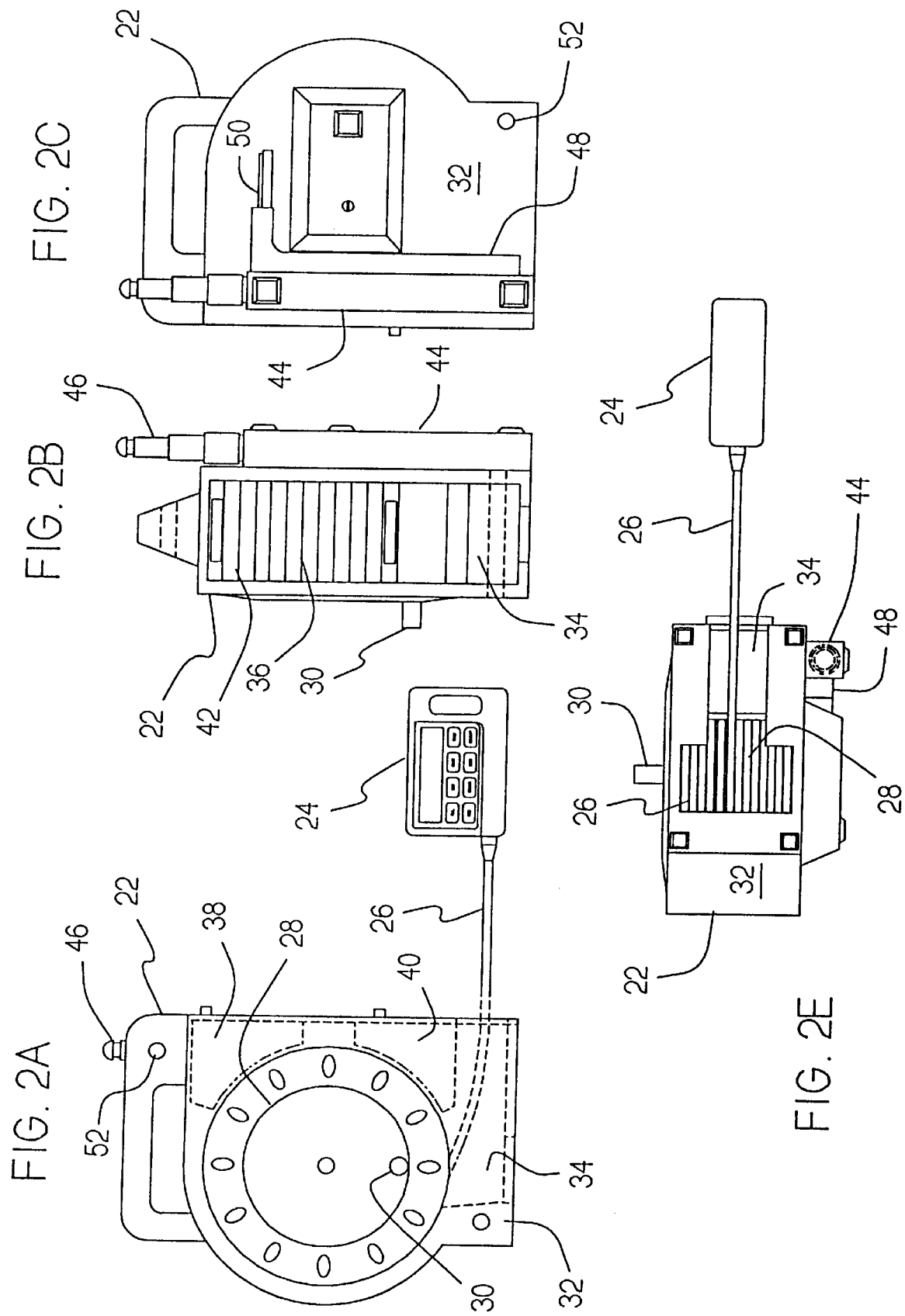

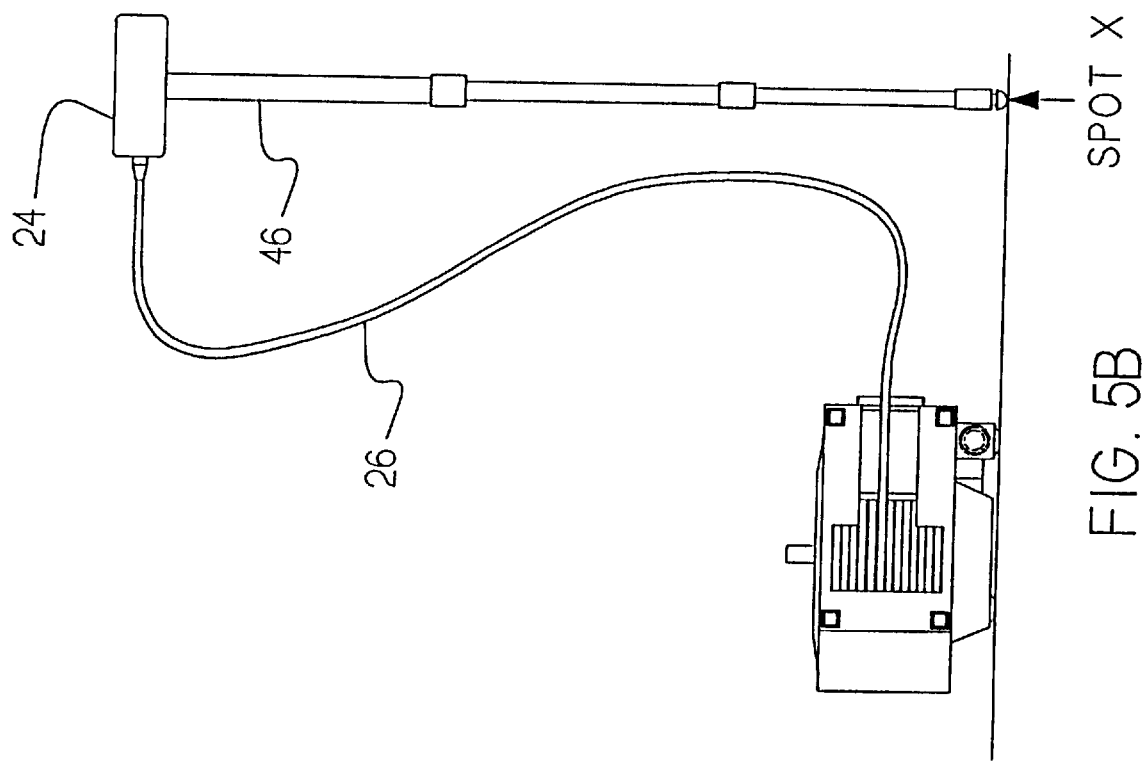
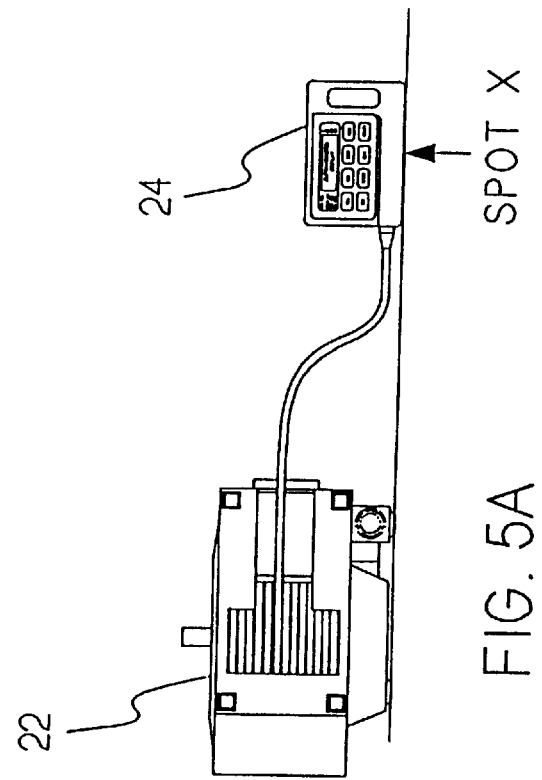
FIG. 5B
FIG. 5A

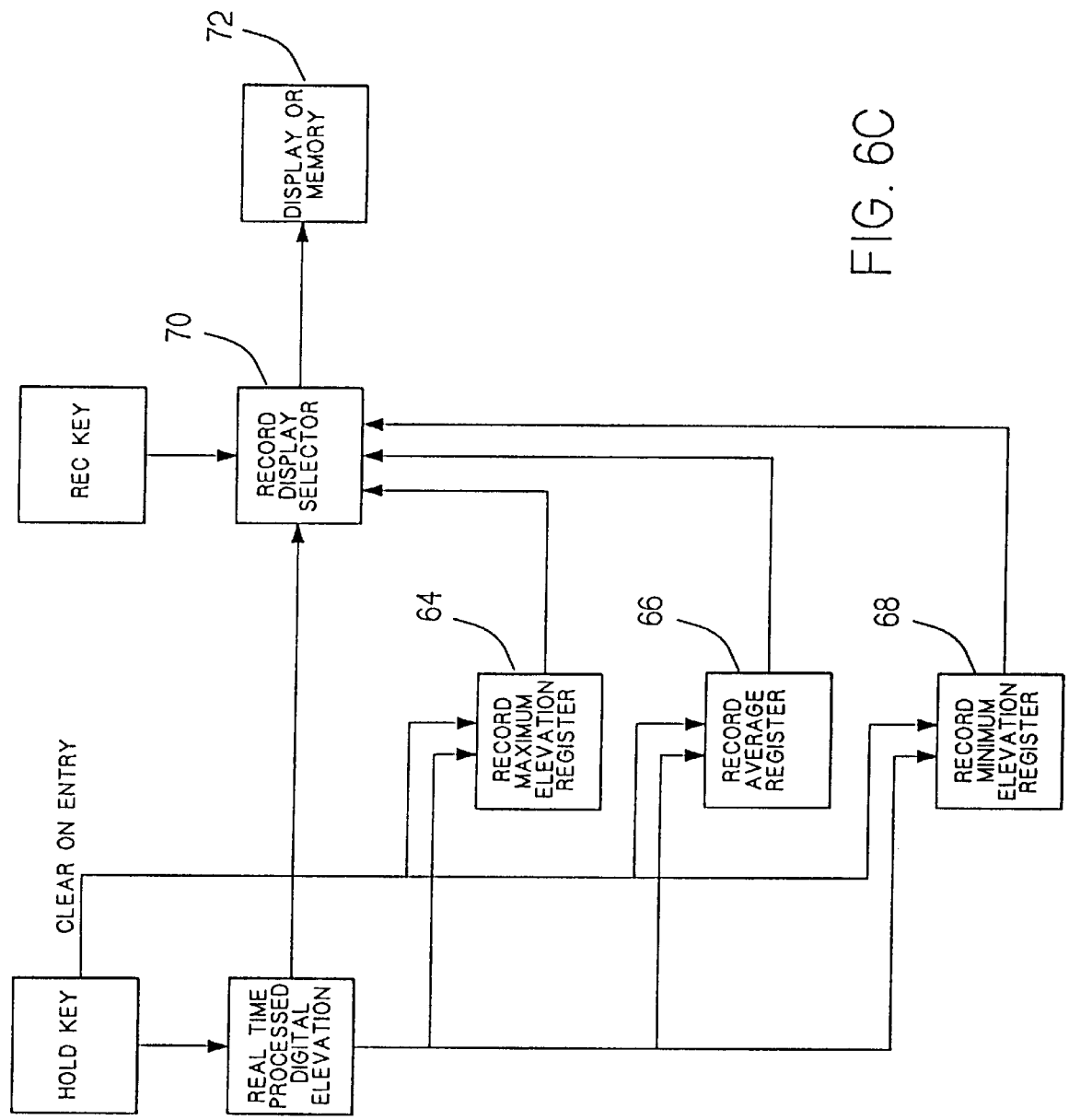

LEAP FROGGING HYDROSTATIC ALTIMETER WITH CARRY FUNCTION

This is a divisional of U.S. application Ser. No. 08/757,008, filed Nov. 26, 1996, now U.S. Pat. No. 5,726,365, which is a continuation of application Ser. No. 08/402,511, filed Mar. 10, 1995, now abandoned, which is a continuation in part of application No. 8/177,532, filed Jan. 5, 1994, now abandoned, the contents of which are incorporated herein by reference.

BACKGROUND OF THE INVENTION

This invention relates in general to hydrostatic altimeters, such as disclosed in U.S. Pat. No. 4,878,297 by Vories, and in particular to certain operational functions incorporated into such altimeters, as described herein.

Advantages and attributes of this invention will be readily discernable upon a reading of the text hereinafter.

SUMMARY OF THE INVENTION

An object of this invention is to provide novel features and improvements to hydrostatic altimeters, e.g. the altimeter presented in U.S. Pat. No. 4,878,297 by Vories.

A further object of this invention is to provide a feature for easily and conveniently establishing benchmark, i.e., reference elevations.

A further object of this invention is to provide a feature that allows such altimeters to be used to measure heights and depths under circumstances in which the elevation display is out of sight, during measurement, of the operator.

A further object of this invention is to provide a feature that allows an operator to selectively freeze stable elevation displays.

A further object of this invention is to provide a feature that allows such altimeters to measure heights and elevations beyond their respective physical reaches.

A further object of this invention is to provide a feature that sets upper and lower limit tones as described in U.S. Pat. No. 4,878,297 by Vories.

A further object of this invention is to provide a feature that calculates and indicates to an operator and/or computer, in real time, an average elevation, a minimum elevation and a maximum elevation for multiple elevation measurements.

A further object of this invention is to provide a feature that allows an operator to select one of five display scales.

A further object of this invention is to provide a feature that allows an operator to select multiple display resolutions that, among other things, provides low precision readings for more rapid readings.

A further object of this invention is to provide a feature that provides an indication of ambient temperature to an operator.

A further object of this invention is to provide a feature that can orderly accumulate 135 or more individual elevation points, e.g. by sequence and position, and/or to download the elevation points as they are being taken to a computer, such as a pocket personal computer (PC).

A further object of this invention is to provide a feature that allows stored elevations to be downloaded to a computer, such as a PC, or to be inspected by an operator as a function of sequence and position.

A further object of this invention is to provide a feature that can be used to display any desired elevation to make readings easier to correlate to drawings drafted in elevation relative to sea level.

A further object of this invention is to provide a feature by which an operator can quickly and easily calibrate such an altimeter in the field.

These and other objects are accomplished by an hydrostatic altimeter having: a base member including a contained fluid reservoir under a reference pressure; a measurement member including: a data processor, differential pressure transducer means for producing a signal corresponding to hydrostatic pressure felt by the transducer means, means for converting signals produced by the transducer to numerical values usable by the data processor, a display for indicating the numerical values; and a flexible, elongated fluid link between the reservoir and the transducer means. The altimeter can also include features for setting a benchmark elevation; for selectively freezing a stable elevation display to hold it constant until released; for calibrating the measurement member; for calculating from a plurality of elevation measurements an average, a minimum and a maximum elevation, and indicating same on the display; for selectively setting the measurement member to audibly indicate whenever the measurement member is at a pre-selected elevation, within a pre-selected band of elevations or without a pre-selected band of elevations; for orderly storing a plurality of elevation measurements for later recall; for recalling and displaying the stored measurements on the display in a selected one of a plurality of ordered sequences; for recalling and downloading the stored measurements to an external data processor; for selectively setting the precision of the elevation measurements to one of a plurality of precisions; for selectively displaying a given elevation in any one of a plurality of measurement scales; for selectively adjusting the value of a measurement to compensate for a physical dimension of the measurement member; and for measuring an elevation beyond the physical reach of the altimeter. A method for measuring elevations beyond the span of the altimeter's link, can include the steps: (a) while positioning the measurement module at a starting point, moving the base unit any distance up to the limit of the link span in the direction of the final destination, (b) storing the starting elevation, sign inverted, into an elevation accumulator, (c) moving the measurement module any distance up to the limit of the link span in the direction of the final destination, (d) communicating the current elevation reading to the elevation accumulator and thereafter freezing the accumulator while moving the base unit any distance up to the limit of the link span in the direction of the final destination, (e) communicating the current elevation, sign inverted, to the elevation accumulator, (f) repeating steps (c) through (e) over the entire distance of the path to be measured, the final elevation display being the total accumulated elevation.

BRIEF DESCRIPTION OF THE DRAWINGS

FIGS. 2A–2E are elevational views of a measurement module and base unit according to this invention.

FIGS. 5A and 5B are views illustrating the use of a CAL function.

FIG. 6C is a functional block diagram of a REC function.

DESCRIPTION OF THE PREFERRED EMBODIMENT

Figure 1:
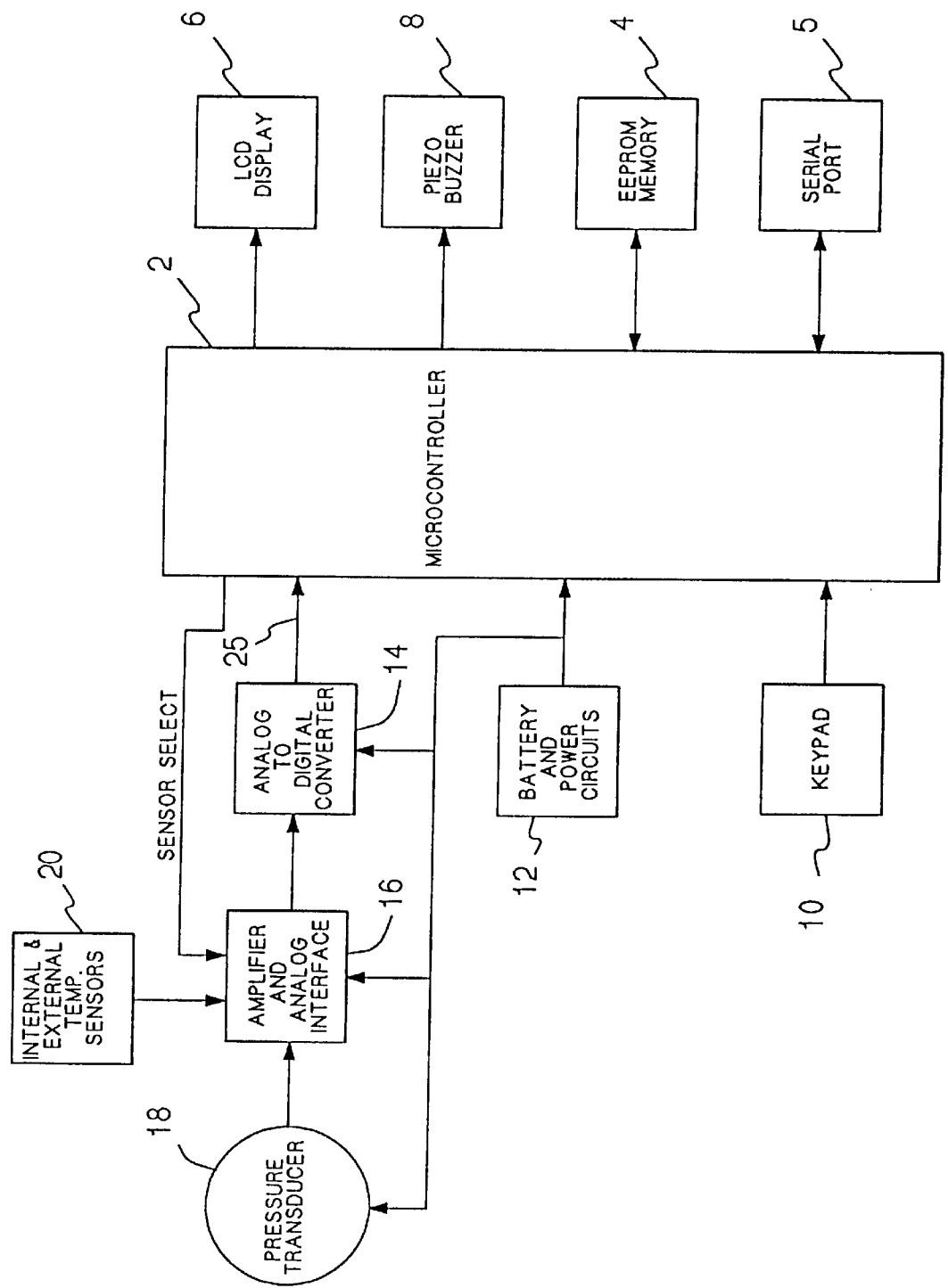
FIG. 1 is a functional block diagram of a measurement module according to this invention.

Referring to FIG. 1, a measurement module is illustrated to have a processing unit 2 which is preferably a microcontroller. The microcontroller includes program memory, preferably pre-programmed read-only memory (ROM), and also communicates with a non-volatile read/write memory, preferably EEPROM 4. The microcontroller also controls a display, such as a liquid crystal display 6, and an audio device, such as a piezo buzzer 8. Preferably the microcontroller and associated circuitry are powered by a battery and power circuits 12. The microcontroller receives, as input, key stroke signals from a keypad 10 and digital data signals from an analog-to-digital convertor 14 which converts an analog signal received from a pressure transducer 18 via an amplifier and interface circuit 16. The signal from the transducer is a measure of the hydrostatic pressure sensed by the transducer in a liquid filled flexible tube communicating with a body of liquid, such as described in U.S. Pat. No. 4,878,297 by Vories. The microcontroller also communicates with a serial communication port 5, such as an asynchronous communication port commonly found on personal computers and lap-top computers. The analog-to-digital converter also receives analog signals from internal and external temperature sensors 20 also via the amplifier and analog interface circuit for pressure sensing analog circuit and liquid temperature compensation.

Referring to FIGS. 2A–2E, a base unit 22 is connected to the measurement module 24 via a flexible fluid conduit 26. The base unit has an internal fluid reservoir contained in a chamber at least partially walled by a flexible bladder that is subject to a reference pressure. The fluid reservoir is in fluid pressure communication with a hydrostatic pressure transducer (not shown) in the measurement module via fluid in the flexible conduit 26. These elements combine and cooperate to produce the digitized hydrostatic signals 25 (FIG. 1) as described in the Vories' patent, U.S. Pat. No. 4,878,297. The base unit further includes a reel mechanism 28 for spooling the flexible conduit 26 as needed. Preferably there are about 100 feet of flexible conduit all of which can be spooled on the reel mechanism by operation of a reel turning handle 30. Preferably the fluid reservoir is disposed within the center of the reel within its axle. The reel and the fluid reservoir container are housed in a casing 32 having a handle grip. The casing includes a passageway 34 which provides a channel for passage of the flexible conduit to and from the reel mechanism. The passageway also includes a portion for docking the measurement module. In this way, the flexible conduit can be entirely spooled on the reel mechanism and the measurement module stored within the casing for convenient transport. The outside entrance to the docking area can be closed by a sliding panel door 36 which slides up and down in opposing grooves defined by the casing. On a bottom (an arbitrary reference designation) of the base unit, the casing 32 defines a "T" shaped slot which opens the passageway 34 to the bottom of the base unit. This slot provides for unencumbered spooling and unspooling of the flexible conduit.

Referring again to 2A–2C and 2E, the base unit can also include upper and lower storage chambers 38 and 40 which open to a front (another arbitrary reference) of the base unit. The lower storage chamber is closable by the sliding panel 36 and the upper storage chamber is closable by a sliding panel 42. On a right side of the base unit is a tubular pocket 44 for storing a telescoping unipod 46. The use of the unipod will be described later. On the same side there is preferably an "L" shaped pocket 48 for stowing one or more "L" shaped stakes 50. These stakes can be used to anchor the base unit to any selected spot on the ground by passing one or both stakes through holes 52 defined by the casing and driving the stakes into the ground.

Figure 2D:
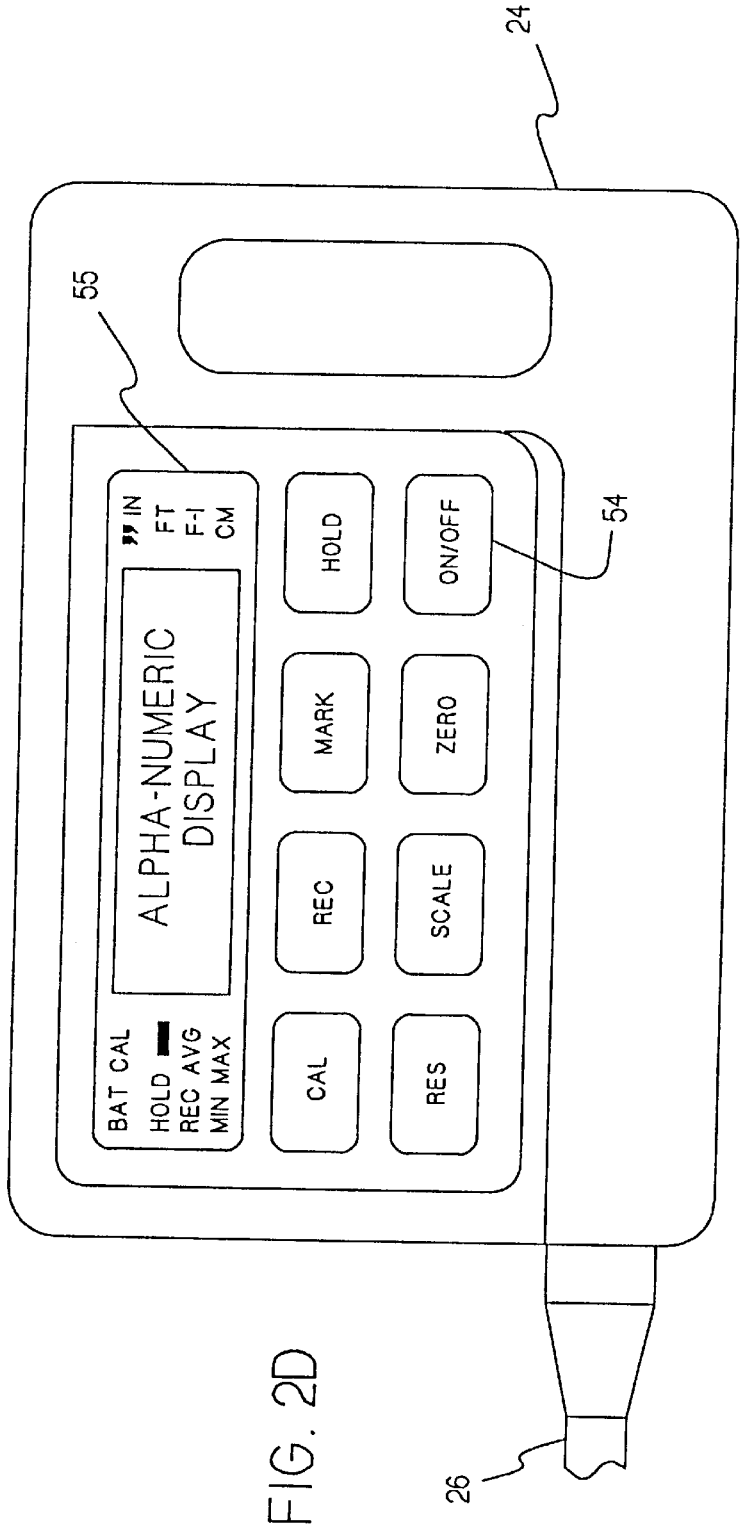
Figure 4:
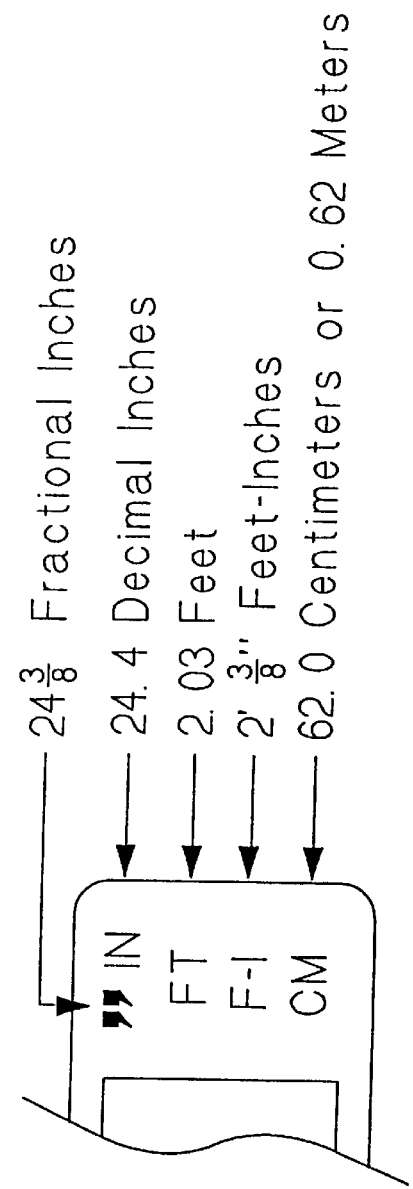
FIG. 4 is a view of a display portion of this invention related to a SCALE function.

Referring to FIGS. 1, 2D and 4, the preferable face of a measurement module 24 is detailed. The most frequently used functions, called "labeled functions," are individually printed on the eight keys 54 comprising the keypad 10. A number of more advanced or less frequently used functions, called "hidden functions," may be accessed by logical key combinations. All keys except the Hold and On/Off keys must be pressed for a continuous period of time, such as two seconds, in order to be valid key entries. This is to minimize accidental operation of a function. Distinctive audible and display indicators are provided for ease of use. For example, when a display reading is stable, i.e. valid to read, the operator will hear an audible indication of such, preferably two short beeps of a "read ready" tone from the piezo buzzer 8. When a reading is stable to store in the memory 4, the microcontroller preferably produces a single long tone. All most recent settings and stored measurements are retained indefinitely in the non-volatile memory, even with power off and without a battery installed. Without movement of the module or a key press for four minutes, the module powers down but only after two long warning beeps at three minutes.

Figure 3A:
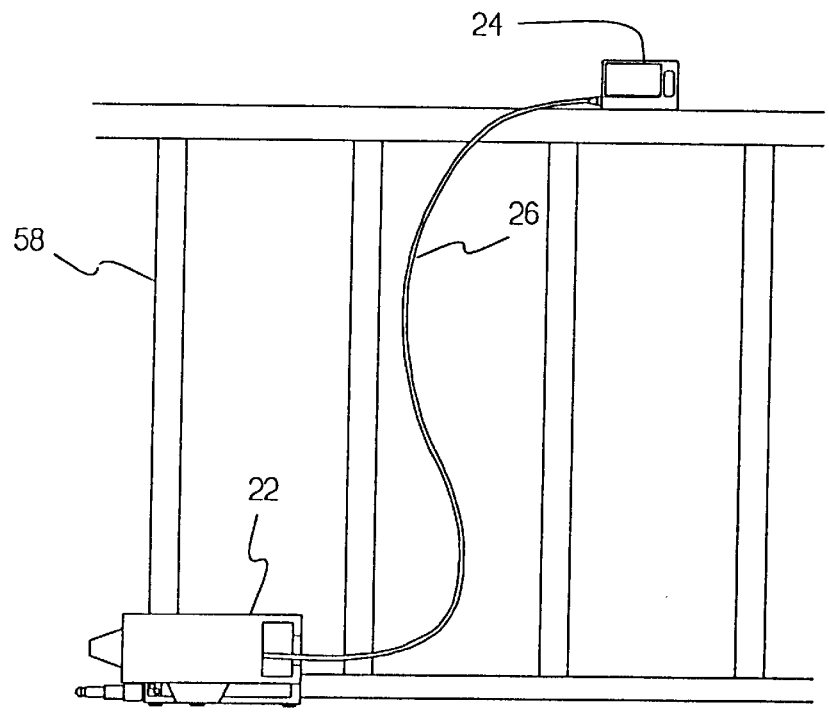
FIGS. 3A and 3B are views illustrating the use of HOLD and ZERO functions.
Figure 3B:
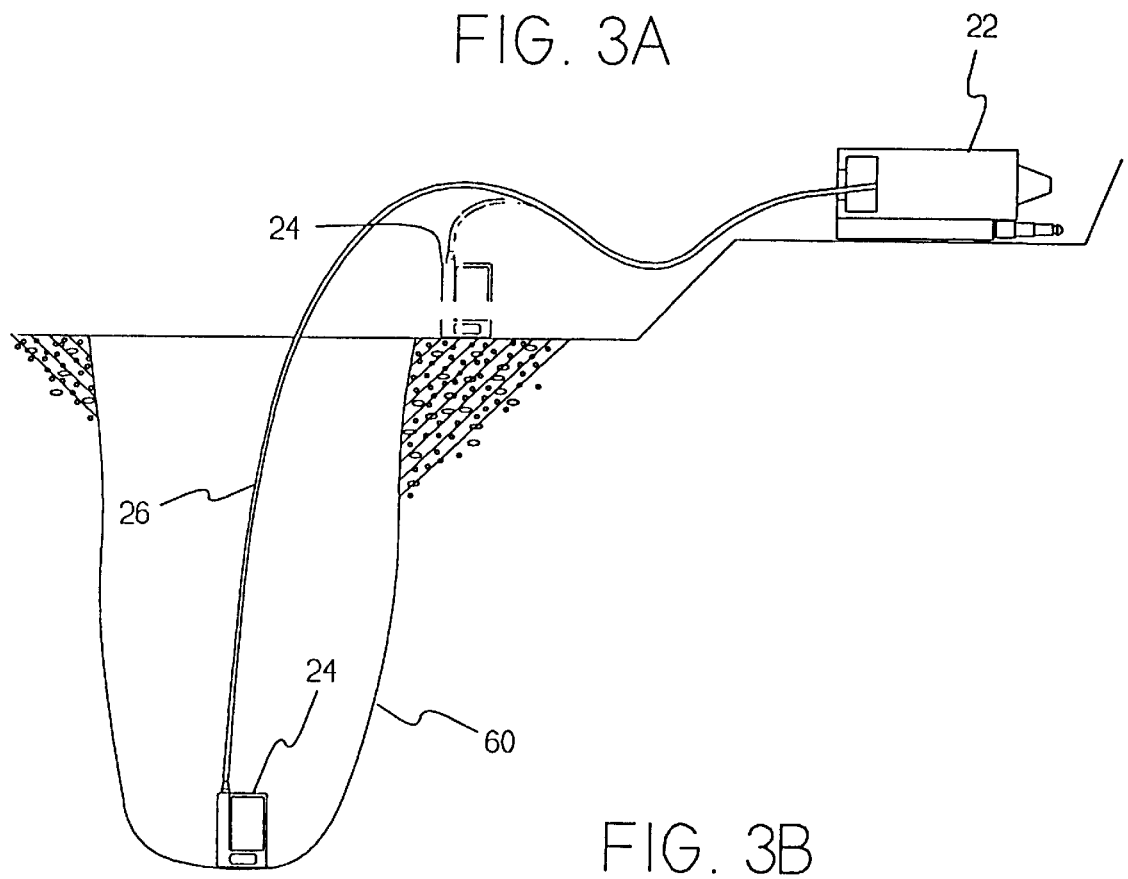

Referring to FIGS. 2D, 3A and 3B, the HOLD key is pressed to freeze the current elevation on the alpha-numeric display, and the key is pressed again to release the display to be updated. When the ZERO key is pressed for two continuous seconds, the current elevation of the measurement module then becomes the zero reference elevation or benchmark elevation. The function of the HOLD key to freeze the display is particularly useful in situations where an operator can reach the measurement module, but cannot read the display. FIG. 3A illustrates the framing of a building. The base unit 22 is at the ground or floor level but the measurement module is atop a wall frame 58 to measure the height of the frame. In such a situation, the operator can press the HOLD key to freeze the display then pull the module down to read the frozen display. In FIG. 3B, the use of both the zero function and the hold function are illustrated. To measure the depth of a hole 60, the operator need not go into the hole to read the display. The operator first makes the elevation at the rim of the hole, the benchmark elevation. This is done by placing the measurement module at the rim of the hole as shown in phantom and pressing the ZERO key for a continuous two seconds. The operator then presses the HOLD key and lowers the measurement module to the bottom of the hole. The hold function will not freeze the elevation display until the module stops moving. After the module has rested at the bottom of the hole, the hold function will then freeze the elevation display, and the operator can then pull the module back out of the hole and read the depth of the hole referenced to the rim of the hole.

Referring to FIGS. 2D and 4, the values displayed in the alpha-numeric display can be in a plurality of scales. To the right of the alpha-numeric display is a column of scale indicators shown larger in FIG. 4. Since the entire display is preferably a liquid crystal display, only one of the dimension indicators will be visible at a time. The quotation marks ("") will be visible if the displayed values are in fractional inches. The "IN" indicator will be visible if the displayed value is in decimal inches. The "FT" indicator will be visible if the displayed values are in engineers' feet. The "F–I" indicator will be visible if the displayed values are in builders' feet-inches. The "CM" indicator will be visible if the displayed values are in centimeters but only the "M" indicator will be visible if the values are in meters. FIG. 4 has an example of an elevation value (62.0 centimeters) in the various corresponding dimensions. A desired dimension is selected by continuously pressing the SCALE key and then releasing it at the appropriate time. After two seconds, the dimension indicators will become visible in a rotating sequence and when the desired one is visible, the SCALE key is then released. Alternately, the SCALE key can be pressed and released to manually sequence through the indicators.

Referring to FIG. 2D, the resolution of the values displayed in the alpha-numeric display can be selected from among preferably three: highest precision, intermediate precision and lowest precision for rough measurements. The higher the resolution, the longer it takes for the measurement module to indicate that a reading is stable. This is due to the fact that the hydraulic system requires more time to reach equilibrium after movement and develop a high precision reading versus a reading of lower precision. To select a resolution, the RES key is pressed for two seconds and held to select a desired resolution. When the RES key is held for two seconds, the display begins to show the selectable resolutions in sequence. For example, it will display "RES.1" for highest precision, then it will display "RES.2" for intermediate precision, then it will display "RES.5" for the lowest precision, and then it will redisplay "RES.1", and so on. An operator merely releases the RES button at the desired resolution. An operator can also manually sequence through the resolutions by holding the RES button for two seconds and then pressing and releasing, and doing this repeatedly.

Referring to FIGS. 2D, 5A and 5B, a calibration function is illustrated. The calibration function is used to calibrate the measurement module for accurate span measurement. The calibration function run by the microcontroller is used in conjunction with the unipod 46 of calibrated length to achieve calibration. An operator first affixes the measurement module to the top of the fully extended unipod, such as by conventional screw means. The operator then presses the CAL key for two seconds which starts a three beep tone and flashes "[0]" on the display. The operator then lays the module on a surface approximately level with the center of the horizontal base unit and again presses the CAL key. When "[48]" flashes on the alpha-numeric display, the operator then raises the unipod upright which raises the measurement module forty eight inches above the surface, and presses the CAL key again. The microcontroller then divides the value it is reading from the analog-to-digital converter into forty eight to obtain a correction factor for future readings. Upon completion of the calibration function, the microcontroller causes the alpha-numeric display to read "48". To exit the calibration function prematurely, the CAL key is pressed for two seconds continuously.

Figure 6A:
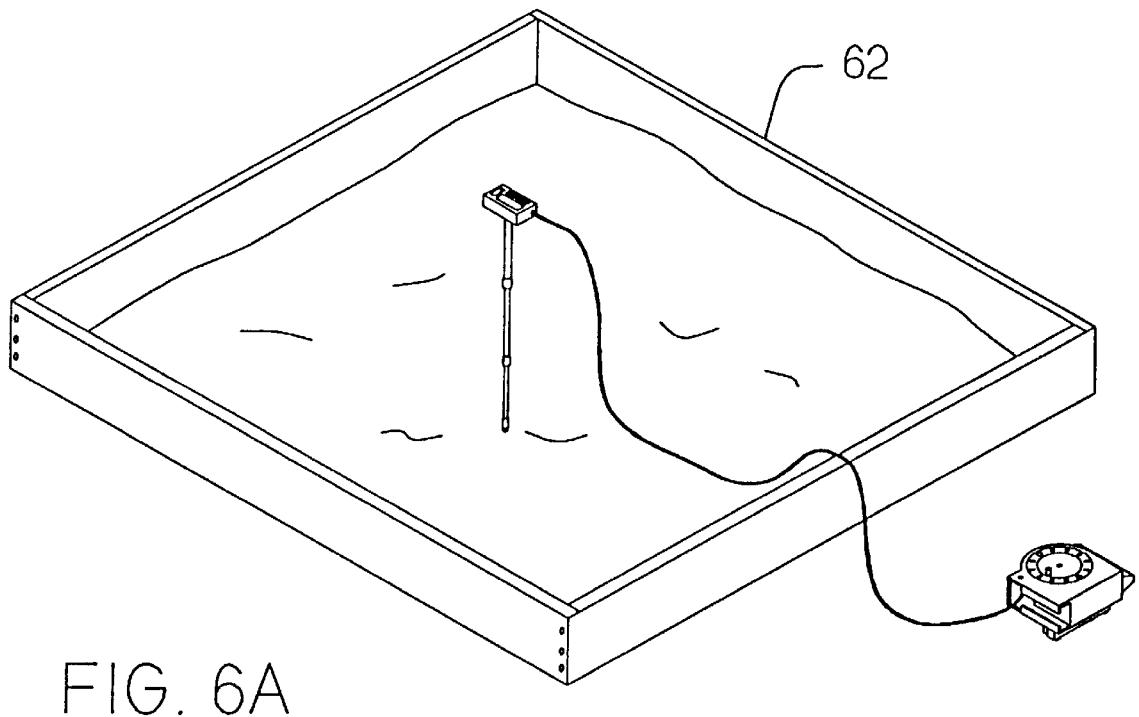
FIGS. 6A and 6B are views illustrating the use of a REC function.
Figure 6B:
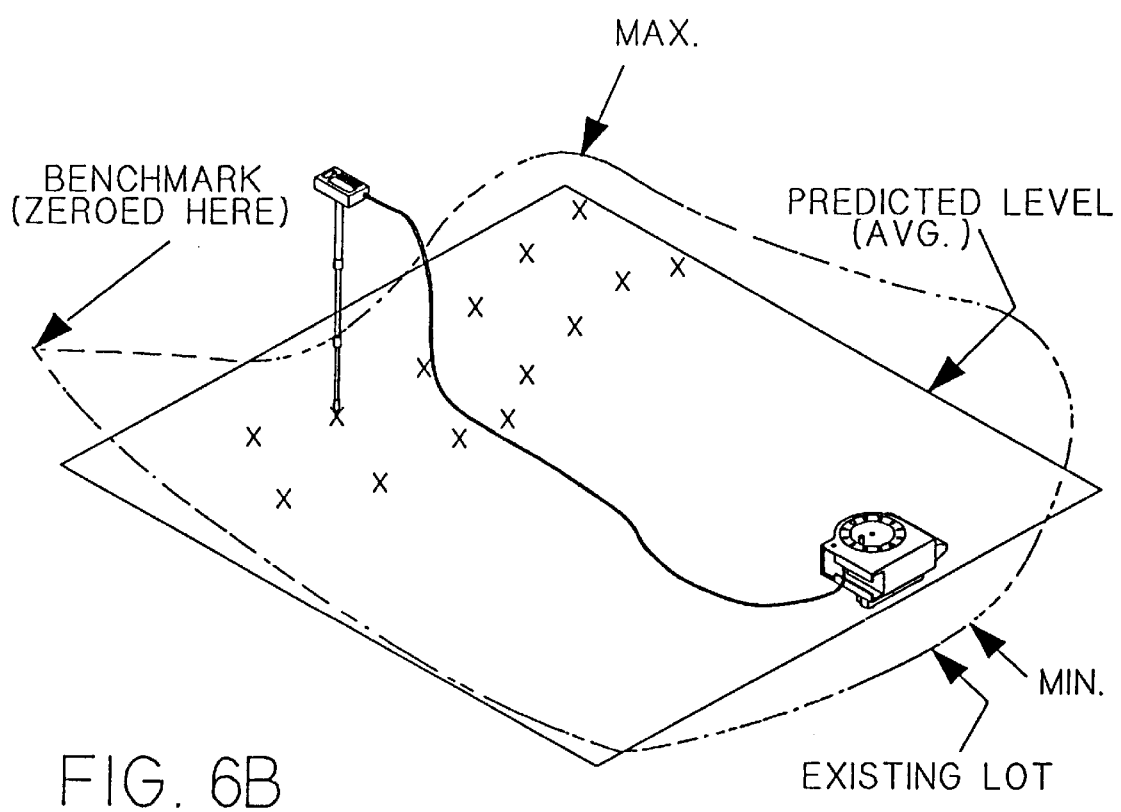
Figure 7A:
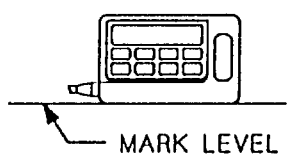
FIGS. 7A–7C are views illustrating the use of a MARK function to select tone parameters.
Figure 7A:
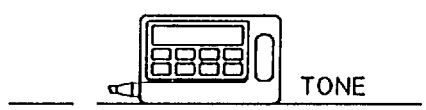
Figure 7B:
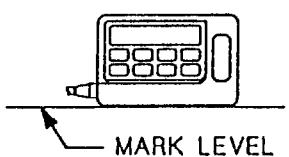
Figure 7B:
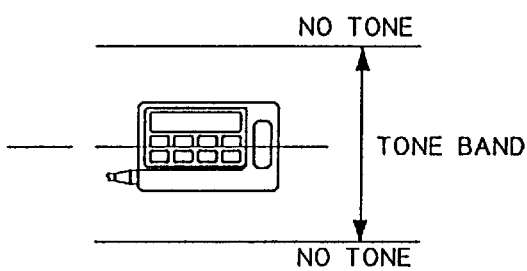
Figure 7C:
Figure 7C:
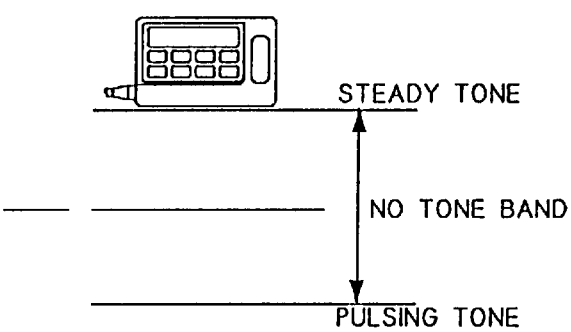

Referring to FIGS. 2D and 6A–6C, the use of the invention to compute the average, minimum, and maximum values for an unlimited number of measurements is illustrated. The REC key is pressed for a continuous two seconds to initiate a record function and activate the REC indicator on the display. Data previously saved in non-volatile memory may be viewed by momentary closures of the REC key to sequence through average, minimum and maximum displays. The HOLD key is momentarily pressed on entering the record mode to clear a maximum elevation register 64, an average elevation register 66 and minimum elevation register 68. The operator thereafter takes any number of elevation measurements over a desired area and the microcontroller calculates the maximum, average and minimum elevations and stores them in their corresponding registers. Average data is the sum of all measurements divided by the number of measurements taken. Every new measurement is compared with the contents of the minimum and maximum registers, if smaller than the minimum or larger than the maximum, the new measurement replaces the contents of the respective register. To view these values the operator presses the REC key to cause a selector 70 to sequence the contents of the registers to the alpha-numeric display or to memory 72. Values are shifted to non-volatile memory on power down. The display mode selected by the REC key will allow continuous display of either the real time elevation with the REC indicator, the average of all measurements with the REC and AVG indicators, the minimum of all measurements with the REC and MIN indicators, or the maximum of all measurements with the REC and MAX indicators. FIG. 6A illustrates the use of the record function to calculate the fill needed below concrete. The module is first zeroed at the bottom level for concrete within a form 62 and a number of measurements are made. The volume of fill needed is calculated by multiplying the average elevation value times the area to be covered by concrete. FIG. 6B illustrates the record mode to predict the elevation of an uneven lot to be leveled by cut and fill. The operator picks a corner for a benchmark, zeros the unit there and then takes a number of measurements across the lot. The operator then uses the REC key to sequence the display to the average value which is the lot elevation after it has been cut and filled.

Referring to FIGS. 2D and 7A–7C, a mark function is illustrated. The mark function is used by an operator to take advantage of the audible tone generating capability of the invention to give audible indications when the measurement module is at a selected elevation, within a selected band of elevations, or without a selected band of elevations. The mark function is initiated by placing the measurement module at a selected elevation, the mark level, and then pressing MARK key for two seconds. If the MARK key is again pressed at that same elevation, then the piezo buzzer 8 (FIG. 1) will sound a tone whenever the measurement module is at that elevation. If prior to pressing the MARK key a second time, the module is lowered to a second desired elevation, the second pressing of the MARK key will set up a tone band of elevations, i.e. a band within which a tone will be sounded. The width of the band will be equal to twice the difference between the mark level and the lower elevation with the mark level being the center of the band. If prior to pressing the MARK key a second time, the operator raises the module to a second selected elevation, then a no-tone band will be created with a bandwidth twice the difference between the mark level and the second selected elevation with the mark level being the center of the band. Thereafter, whenever the module is at or above the high end of the band, the module will preferably emit a steady tone, and whenever the module is at or below the bottom of the band, the module will preferably emit a pulsing tone. A fraction bar within the alpha-numeric display flashes while in the Mark function. The MARK key is pressed for two seconds to exit, and settings will be lost. To exit and retain settings, the MARK and then ON/OFF keys are pressed together.

The measurement module also has internal and external temperature sensors as previously discussed (item 20 of FIG. 1). An operator can cause the external temperature to be displayed on the alpha-numeric display by pressing the ON/OFF key for two seconds when first turning the module on. At that point the temperature will be displayed. Pressing any other key exits the temperature function.

Figure 8A:
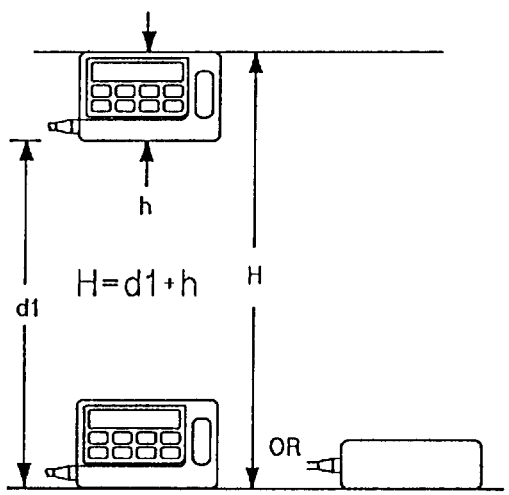
FIGS. 8A and 8B are views illustrating the use of an ADDER function.
Figure 8B:
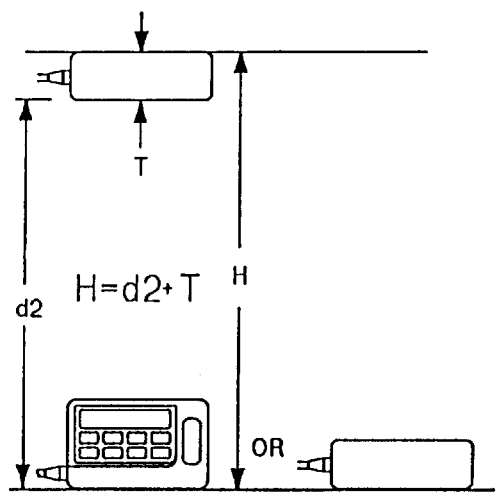

Referring to FIGS. 8A and 8B, an adder function is illustrated. In one mode the adder adds the height of the measurement module for measurements between its bottom and top. FIG. 8A is an example of this. When the operator makes the upper measurement, the adder function is initiated by pressing the HOLD key to freeze the upper measurement and then pressing the MARK key for two continuous seconds. This causes the microcontroller to add the height "h" of the module to the frozen measurement d1 to arrive at the true elevation H. The adder function also corrects for back down to back up measurements (e.g. floor to ceiling inverted). FIG. 8B is an example. Again, the operator freezes the upper measurement by pressing the HOLD key, but then the operator presses the REC key for two continuous seconds. This causes the microcontroller to add the width T of the memory module to the measured height d2 to derive the true elevation H.

Figure 9:
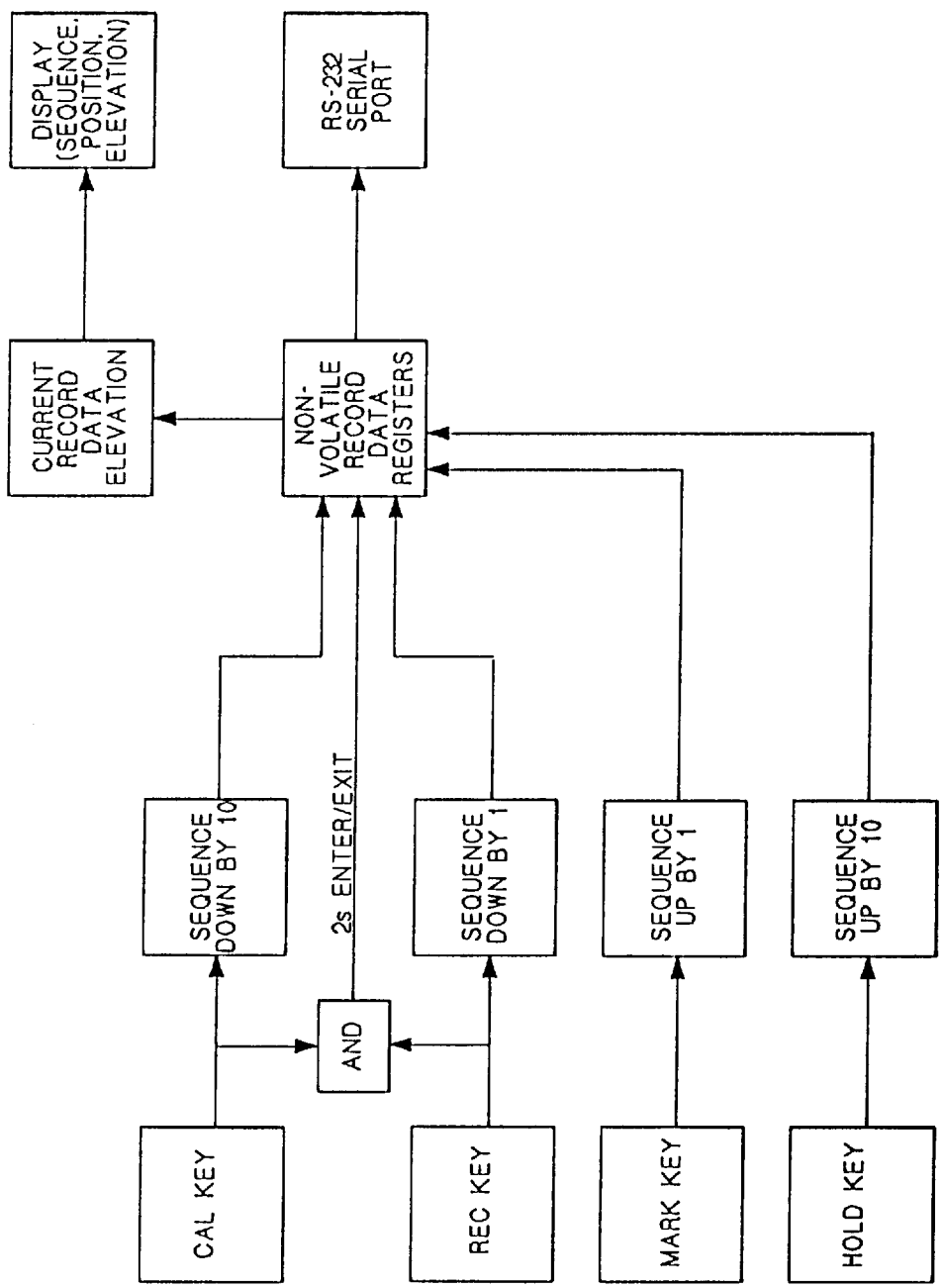
FIG. 9 is a functional block diagram of an INSPECT function.

Referring to FIG. 9, an inspect-dump function is illustrated. Data stored in the non-volatile record data registers can be visually inspected by an operator or communicated to a computer, such as a personal computer. To inspect, an operator presses the CAL and REC keys simultaneously for two seconds. This puts the microcontroller in an inspect mode and the contents of a first register are displayed, preferably the last data register filled. The operator can then sequence through the registers by preferably ones and tens, either up or down. Preferably pressing the CAL key sequences the records down by ten. Pressing the REC sequences the records down by one. Pressing the MARK key sequences the records up by one and pressing the HOLD key sequences up by 10. The contents of each selected register is transferred to a current record data elevation register, and from there it is accessed by the display which provides sequence, position and elevation information. Pressing REC and CAL keys momentarily causes the microcontroller to transfer the contents of the non-volatile registers to a computer via the serial port.

An initialize function allows the resetting of all operator settings (including calibration) to default values and returns from any function to the normal display function. This is a way to recover from an unwanted function. This initialize function is actuated by pressing the CAL, REC, MARK and HOLD keys simultaneously for two seconds.

Figure 10:
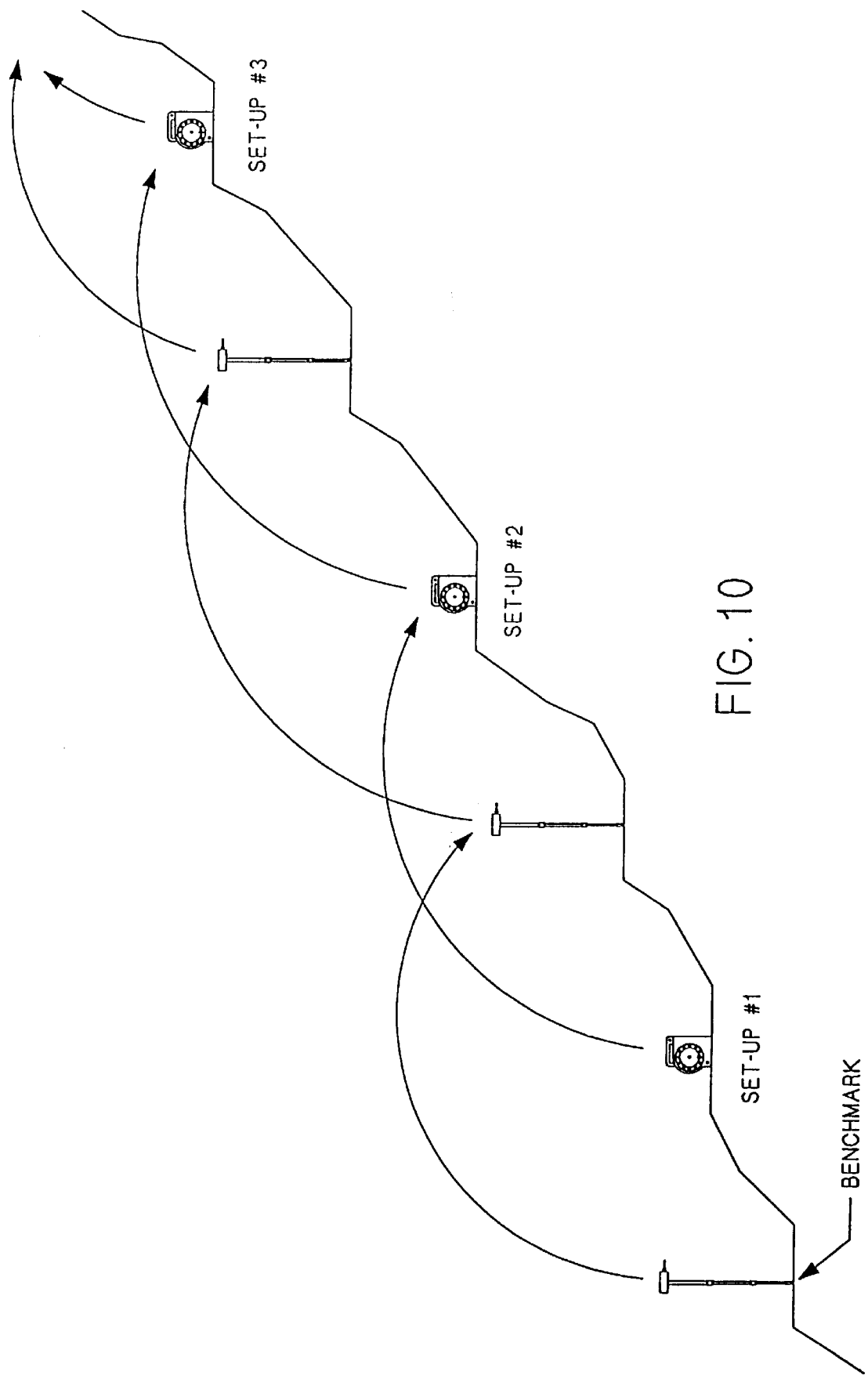
FIG. 10 is a view illustrating the use of a CARRY function.
Figure 11:
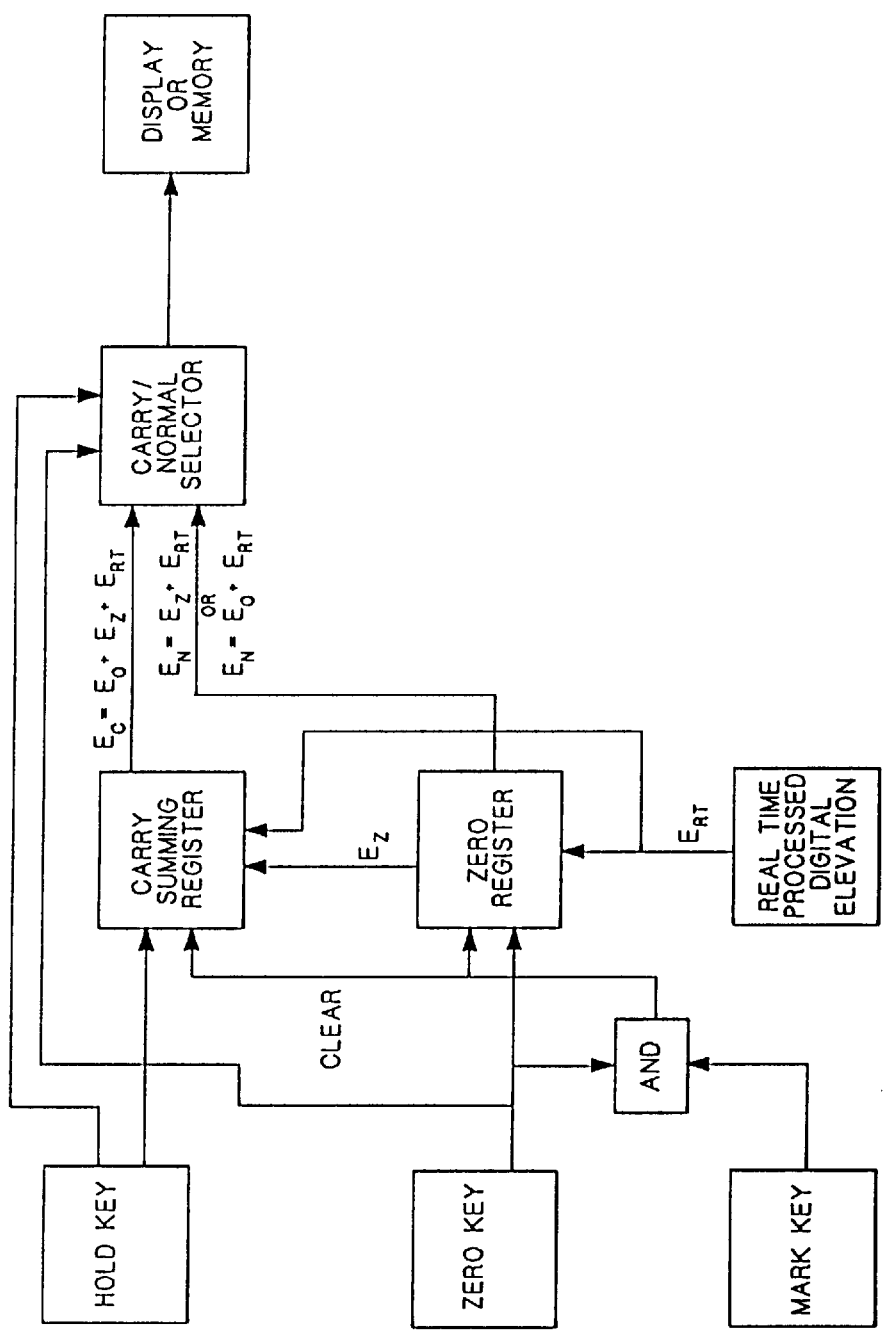
FIG. 11 is a functional block diagram of the CARRY function.

Referring to FIGS. 10 and 11, a carry function is illustrated. By using the carry function, this invention can be used to measure the height of a mountain or locate an elevation across town with no pencil, paper or calculator needed. The carry function allows measurements over any distance or elevation on Earth without manual tabulation or computation by simply leap frogging the measurement module with the base unit. To start at set-up number one, the ZERO and MARK keys are pressed together for two seconds at the reference or benchmark which causes the display to alternate "CARRY" and "[0]" until the current real-time elevation $E_{RT}$ is stable. This writes $-E_{RT}=E_0$ into the zero register and clears an elevation accumulator, i.e. the carry summing register for a zero reading at the benchmark for both the normal and the carry display modes. The measurement module is moved any distance up to the limit of cord range in the direction of the final destination and the HOLD key is pressed locking the present elevation $E_{RT}+E_0$ on the display and into the carry summing register. Without moving the measurement module, the base unit is moved as far as the cord will allow in the direction of the destination, e.g. to set-up number two, and when secured in position the ZERO key is pressed two seconds causing the carry/normal selector to select the carry function and sum $E_Z$ ($-E_{RT}$ for the new base unit position) with the carry register contents for an output to the display of $E_C=E_0+E_Z+E_{RT}$. In the carry function the display alternates between a upper display having a leading "C" and a lower display, the two displays are required to accommodate more range than a single display. This leap frogging, HOLD/ZERO sequence can be repeated indefinitely over any distance or elevation, but while in the carry function only momentary closure of the ZERO key is required.

Within any set-up, one may exit the carry function by pressing the ZERO key for two seconds causing the carry/normal selector to switch to the normal display where $E_N=E_0+E_{RT}$ if in the first set-up where carry was zeroed or $E_N=E_Z+E_{RT}$ in a subsequent set up where $E_Z$ represents the elevation of the last carry HOLD/ZERO. As the functional diagram illustrates, the measurement module can then be zeroed anywhere within the set-up outside of the carry function and later re-enter the carry functions anywhere within that set-up and continue toward the destination without corruption of carry register data.

When the elevation set function is used at the benchmark, $E_0$ becomes the preset elevation.

Figure 12A:
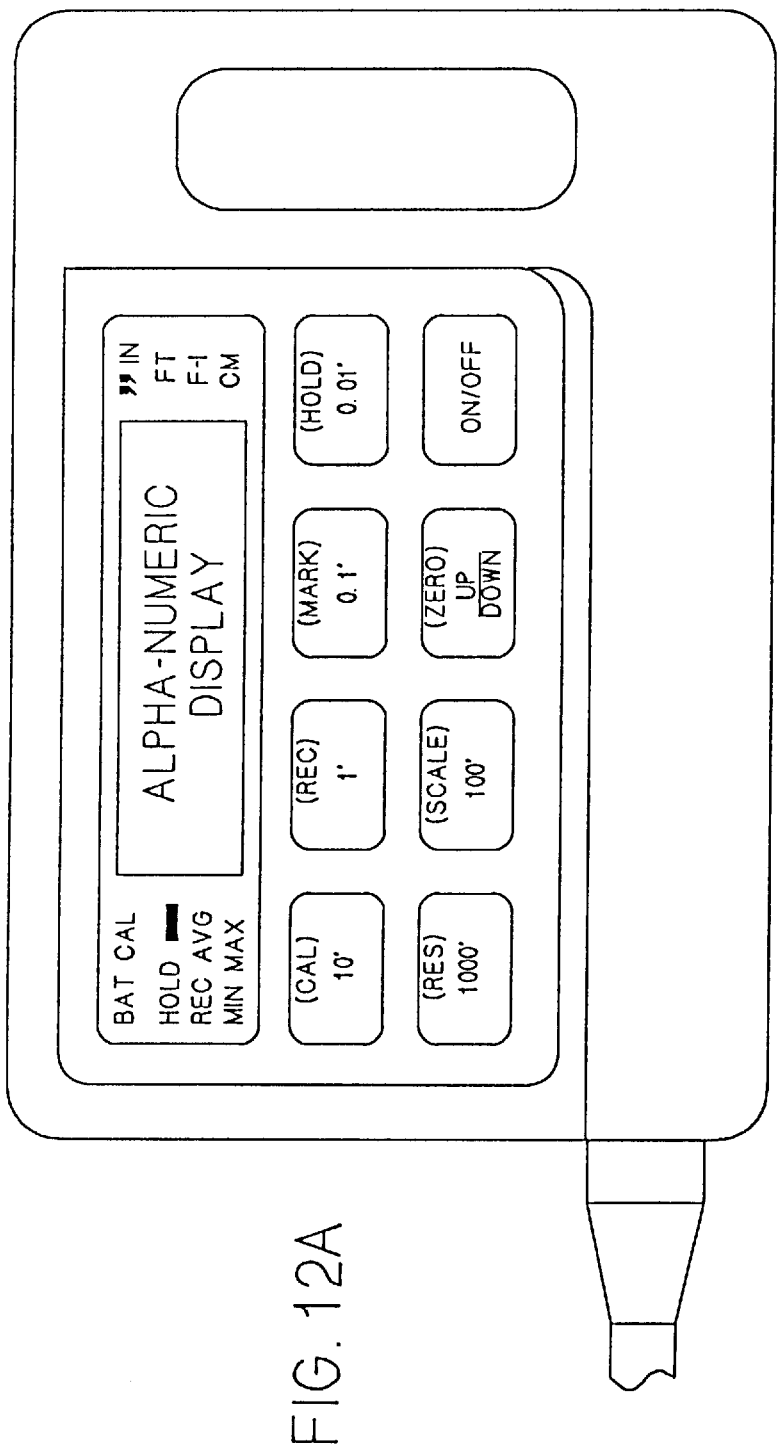
FIGS. 12A and 12B are views illustrating the use of an ELEV function.
Figure 12B:
Figure 12C:
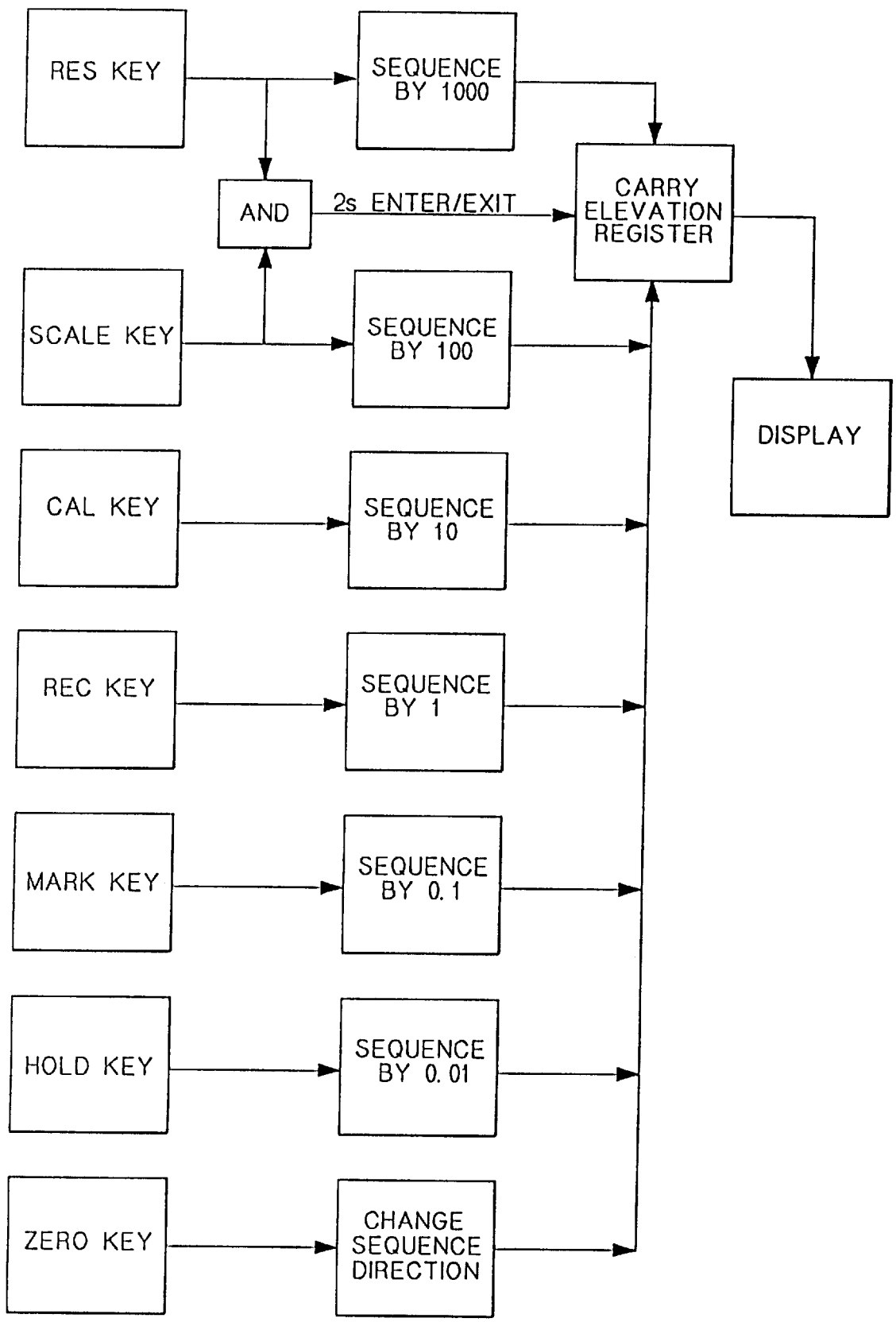
FIG. 12C is a functional block diagram of the ELEV function.

Referring to FIGS. 12A and 12B, an elevation function is illustrated. By this function an operator can preset the measurement module display 55 to a benchmark elevation, e.g. elevation above sea level, in engineers' (FT) scale for use in the carry function. To enter the elevation function, an operator presses the SCALE and RES keys simultaneously for two continuous seconds. Once the elevation function is initiated, the key pad becomes basically a numeric key pad for setting the benchmark elevation. Pressing the RES key sets the thousands digit and the SCALE key sets the hundreds digit. The CAL key sets the tens, the REC key sets the ones, the MARK key sets the tenths, the HOLD key sets the hundreds digit, and the ZERO key selects whether the sequence of digit entry is up or down. These values are set in a carry elevation register which can be viewed by the display. The elevation and carry functions are cleared to zero by pressing the MARK key and the ZERO key for two seconds. The alpha-numeric display alternates between most significant and less significant digits as illustrated in FIG. 12B to enable setting large elevations.

Figure 13A:
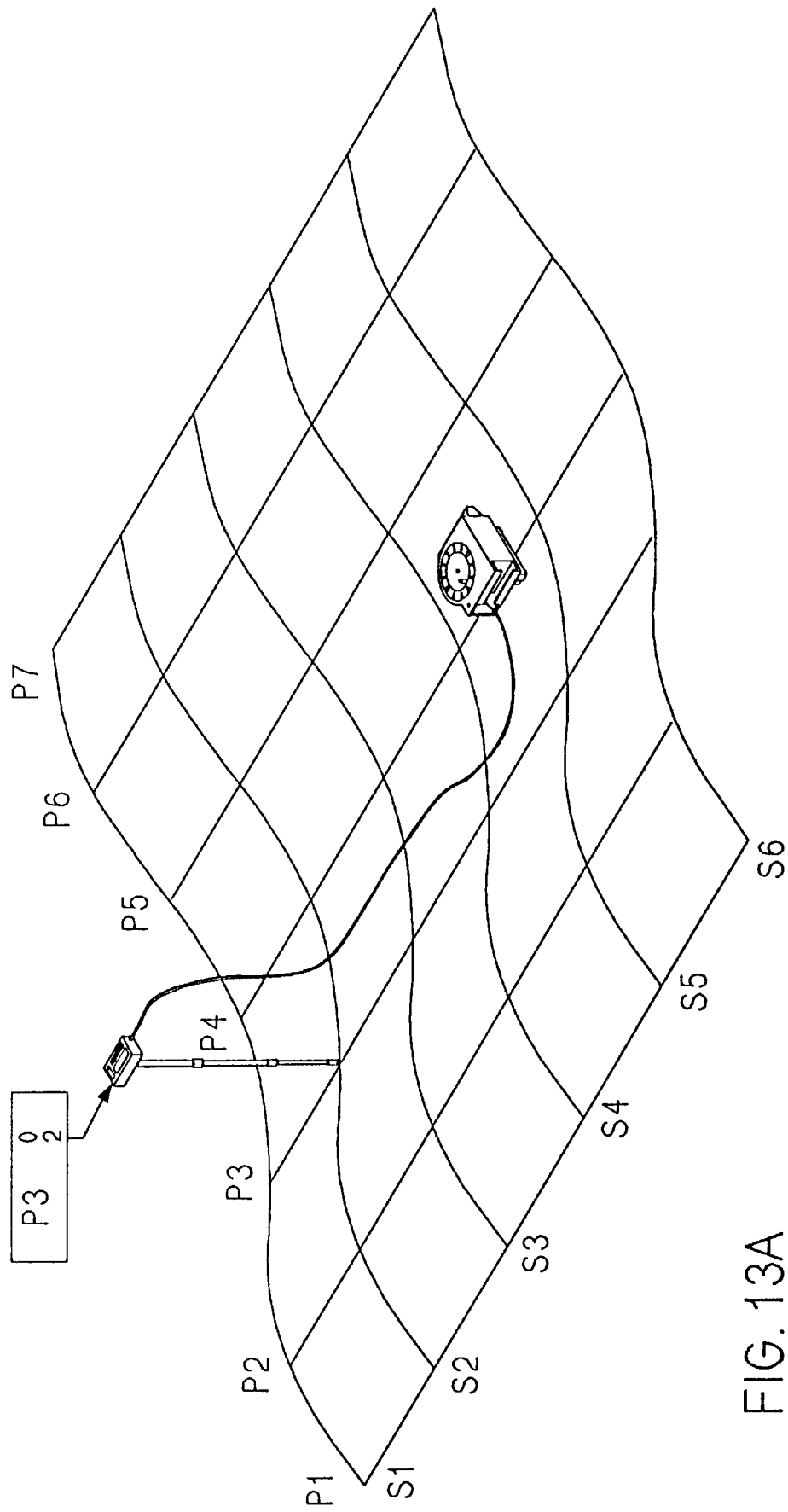
FIG. 13A is a view illustrating the use of a REC DATA function.
Figure 13B:
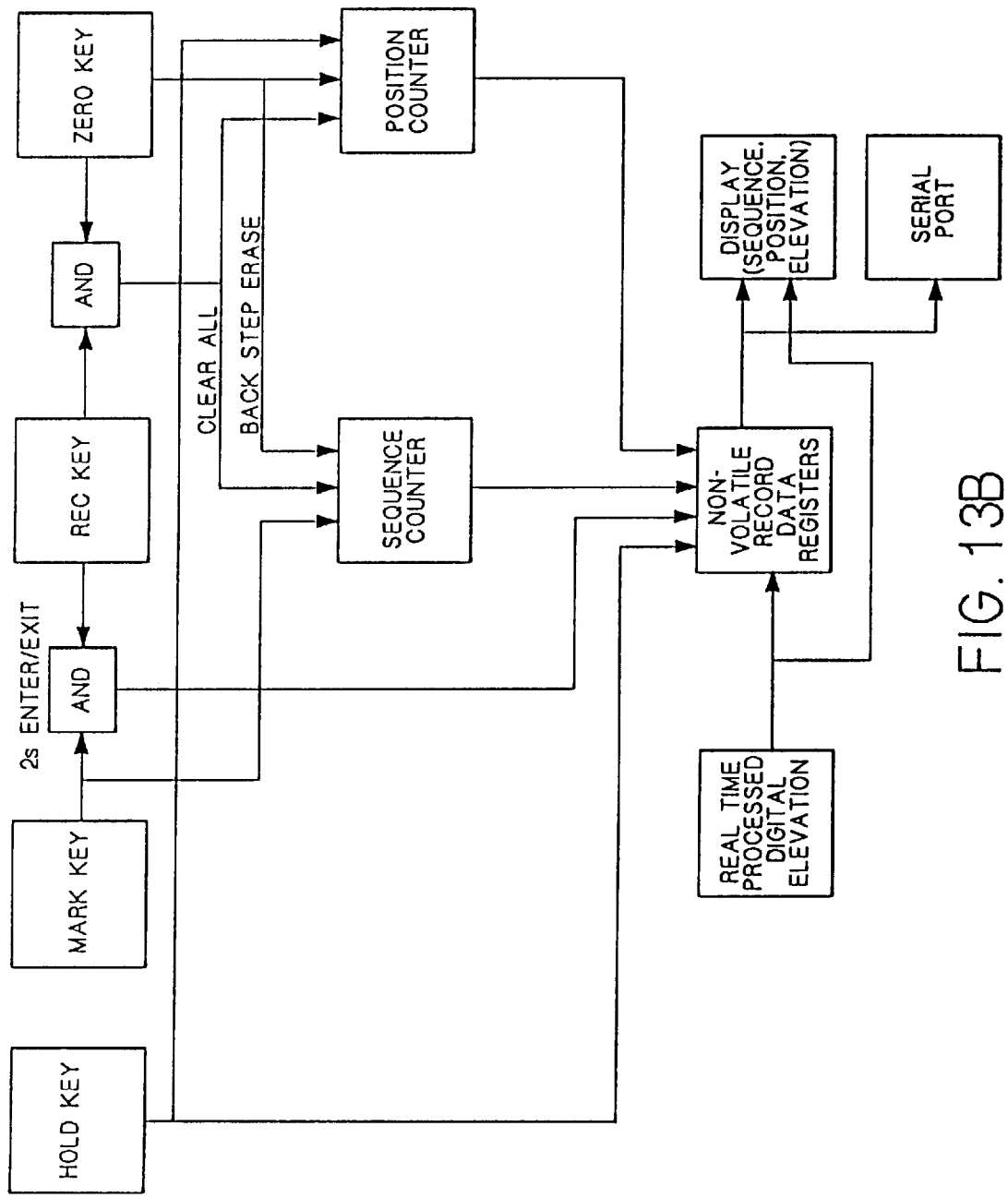
FIG. 13B is a functional block diagram of the REC DATA function.

Referring to FIGS. 13A and 13B, the record data function allows storage of measurements for later recall or transfer to a personal computer for tabulation and analysis or graphing of site profiles, sections, three dimensional or contour maps i.e. the altimeter comprises means for downloading in real time measurements to a data processor external thereto. To enter or exit the record data function, the REC and MARK keys are pressed for two seconds. Previous contents of the non-volatile sequence and position counter registers are cleared by pressing the REC and ZERO keys together for two seconds. Each momentary press of the HOLD key increments the position counter and stores the new position value with the elevation in non-volatile data registers. During this process the same information is sent out the serial port and the position and sequence are momentarily flashed on the display. Pressing the MARK key for two seconds increments the sequence counter. Twenty measurements before the registers are filled, the display flashes FULL and the number of measurement registers remaining. When all registers are filled, positions are preceded with an "F" rather than a "P" with each measurement taken and the data continues to be sent to the serial port for real time recording of any number of measurements on a portable or pocket PC. FIG. 13A illustrates the use of this function for taking measurements over a grid of regular surface intervals for a contour or three dimensional map. One sequence (S1, etc.) can define a profile or section (P1, etc.) of a surface.

Referring again to FIG. 2, the CAL indicator flashes if the module should be recalibrated due to a temperature change. It is on constantly when the module is outside of the −22° F. to +158° F. operating temperature range because measurements may be in error. A "- - - 0 - - -" periodic flash on the display indicates re-zeroing is needed due to temperature change. The figure "8888" alternates with displayed elevation when the module is more than 20' above or below the base unit. Over-range measurements may be in error. The indicator BAT flashes when a few hours of battery life remain. A fresh 9V Alkaline battery can allow up to 70 hours of use.

Figure 14:
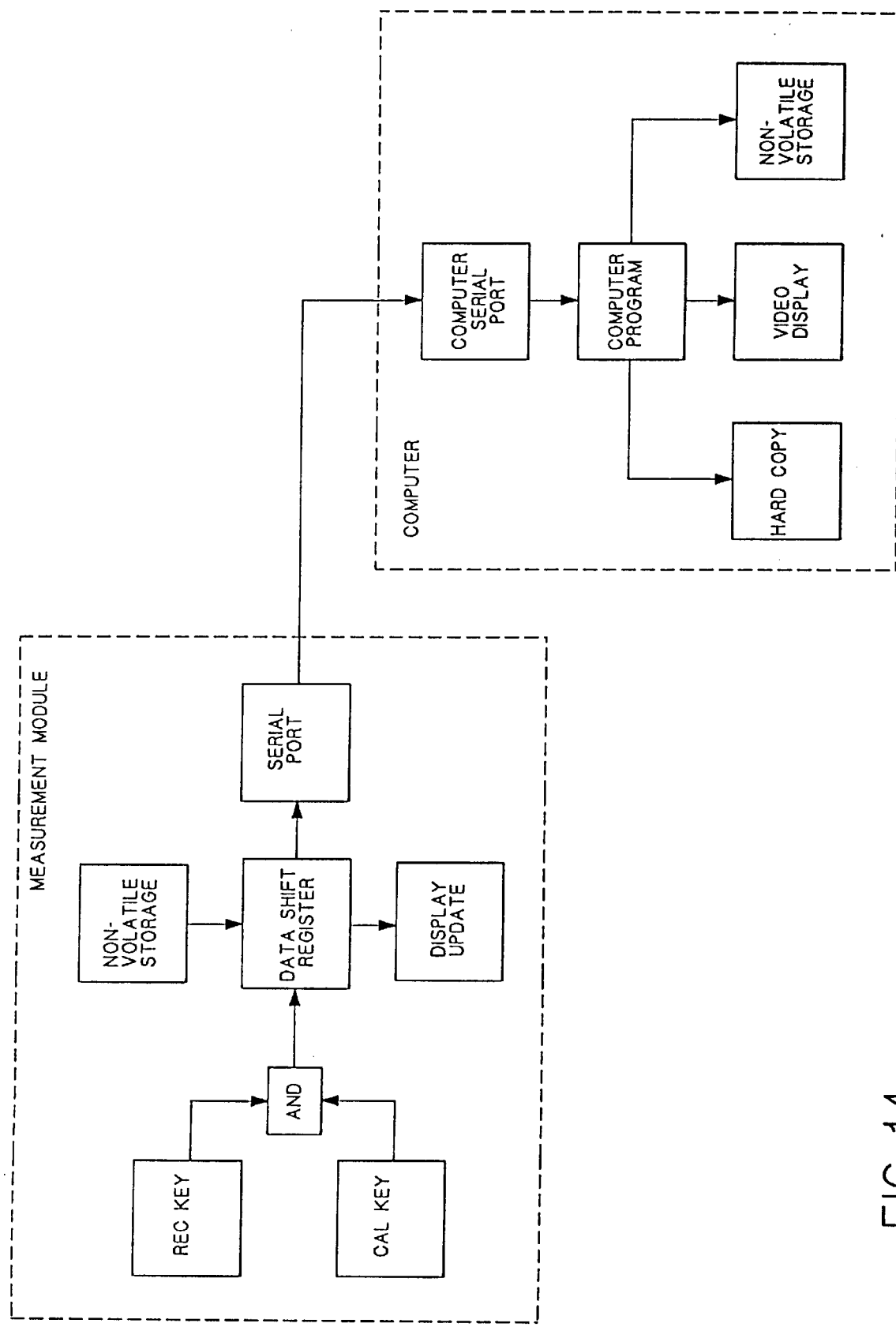
FIG. 14 is a functional block diagram of a serial communication link between a measurement module according to this invention and a computer, such a lap top.

Referring to FIG. 14, another highly unique and significant improvement is the serial port which can be infrared coupled. The port permits simplex dumping of either stored or real time data to an RS-232C port of an office or field PC for analysis and tabulation or plotting of profiles, 3D or Topographical maps. The serial port is also used for automated factory test of the product. This factory test mode is entered by pressing both the ON/OFF and CAL keys for one or two seconds while switching on the power. Since the auto power down is disabled in this mode the measurement module might be used as a monitor function for continuous monitoring of elevation for data logging to a modem or portable PC at a remote site such as with the base unit floating on water in a storage tank, stream or reservoir.

A "Read Ready" tone sounds a pair of short beeps when the most recent incoming data samples are stable to within a preset tolerance (such as +/−0.1") of the averaged reading on the display.

A "Store Ready" tone sounds a single long tone only when the most recent incoming data to be saved is within a preset tolerance (such as +/−0.050") of the averaged display data.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:
1. A hydrostatic altimeter comprising:
  (a) a base member including a contained fluid reservoir under a reference pressure;
  (b) a measurement member including:
    (1) differential pressure transducer means for producing a signal corresponding to hydrostatic pressure felt by the transducer means, and
    (2) means for converting the signal produced by the transducer means to a corresponding numerical value;
  (c) a flexible, elongated fluid link for providing fluid pressure communication between the reservoir and the transducer means;
  (d) means for accumulating numerical values while leap frogging the base member and the measurement member over a selected path; and
  (e) means for displaying the accumulated total to an operator, the total being the elevational difference between the start of the path and the end of the path.
2. The altimeter according to claim 1 further comprising means for pre-setting the display to a benchmark elevation before leap frogging.

* * * * *